(No Model.)
A. C. HEDDEN.
FRUIT PICKER.
No. 516,889. Patented Mar. 20, 1894.
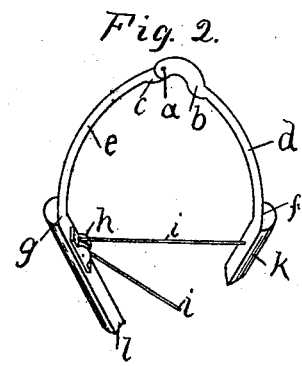
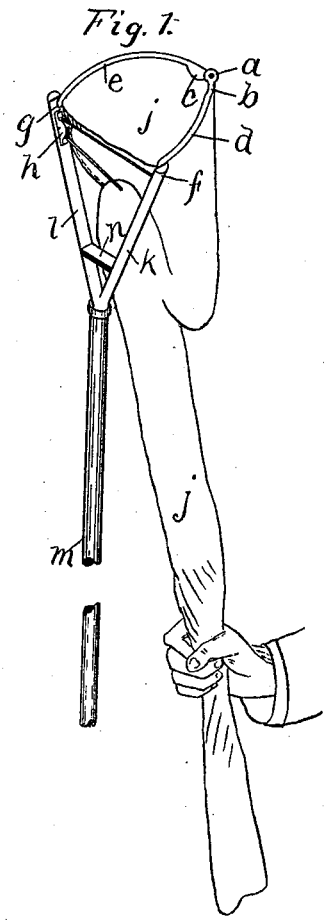
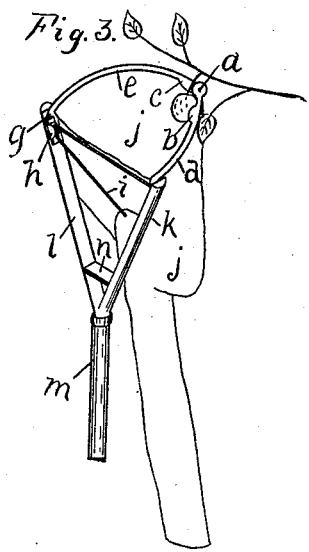
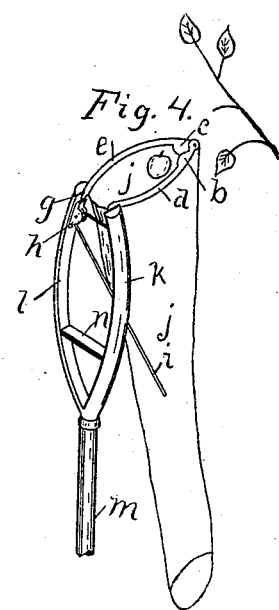
WITNESSES:
Aaron C. Hedden INVENTOR
BY
J. C. Bookstaver ATTORNEY

UNITED STATES PATENT OFFICE.

AARON C. HEDDEN, OF ITHACA, NEW YORK.

FRUIT-PICKER.

SPECIFICATION forming part of Letters Patent No. 516,889, dated March 20, 1894.

Application filed November 6, 1893. Serial No. 490,174. (No model.)

*To all whom it may concern:*

Be it known that I, AARON C. HEDDEN, a citizen of the United States, residing at Ithaca, in the county of Tompkins and State of New York, have invented certain new and useful Improvements in Fruit-Pickers; and I do hereby declare that the following is a full, clear, and exact description of the invention, which will enable others skilled in the art to which it appertains to make and use the same, reference being had to the accompanying drawings, forming part thereof.

My invention relates to fruit pickers or gatherers in general, and particularly to pickers of fruit which require the stem to be cut; and my object is to provide an improved device of simple and cheap construction, by which all such fruit, as oranges, lemons, &c., may be picked or gathered with ease, without use of ladders. This novelty of construction and combination is fully explained in the following specification, reference being had to the accompanying drawings, in which—

Figure 1.— is a perspective view of my fruit picker, showing it in its normal position. Fig. 2.— is a view in perspective, of the jaws of my fruit picker showing the position of the knife or cutter, the pulley wheel, and the cord. Fig. 3.— is a perspective view of my fruit picker, showing it in position to cut an orange from the tree, and—Fig. 4.— is a perspective view of my fruit picker, showing the jaws closed after picking the fruit.

Referring to the drawings—in Fig. 1.—,(b) represents one of the blades of the cutter, and (c) the companion blade, riveted together at (a). These blades are respectively of a concave and a convex form on the cutting edges which causes an entering stem to hold instead of slipping out. These cutters are formed on or attached to the ends of the heavy wire jaws (d) and (e) which are bent outward from the cutter in a semicircular shape, the concave sides being toward one another, and both on the same plane. The ends (f) and (g) of these wire jaws are bent downward at right angles to the plane of the jaws, and are secured firmly to the divided arms (l) and (k) of the rod (m) in a suitable manner. On the upper end of one of the arms aforesaid is secured the pulley wheel (h) through which is run the cord or chain (i) one end of which is secured to the upper end of the opposite arm, and the lower end is secured to the tubing (j) at such a point that a pull upon the tubing will pull the cord or chain, and close the jaws, thus operating the cutter. The arms (k) and (l) are kept apart and made to spring, by means of the wedge or brace (n) which is forced between them, thus holding the jaws and cutting knives normally open. The tubing (j) is secured at its mouth to the under part of the jaws (d) and (e).

In use, the rod is held in one hand and the tubing is grasped in the other. The jaws are placed around an orange so that the stem slips between the knives of the cutter, which it does naturally on account of the shape of the jaws. The tubing is then given a sharp pull which draws the cord or chain (i) closing the jaws and cutting the stem of the fruit, and allowing it to drop into the tubing.

The tubing may be made of any suitable material, and the pulley wheel may be replaced by a bell crank, or the cord may be replaced by a sprocket chain and the pulley wheel by a sprocket wheel and the rod (m) may have a spring attached, in place of the divided arms; but the arrangement illustrated in the accompanying drawings shows the simplest and cheapest and most effective way. The brace (n) may be made of any material, but is made loose, so that different adjustment of the spring in the jaws may be effected at will by raising or lowering it.

Having thus described my invention as above, what I claim, and desire Letters Patent for, is—

In a fruit picker, the combination with the rod (m), of the spring arms (k) and (l), the brace (n), the wire jaws (d) and (e) with the cutters (c) and (b), the cord or chain (i), the pulley wheel (h), and the flexible tubing (j) attached to, and operating the jaws (d) and (e) by means of the cord or chain (i) and the pulley wheel (h); substantially as described and for the purpose specified.

In testimony of which I have hereto affixed my signature in the presence of two witnesses.

AARON C. HEDDEN.

Witnesses:
C. H. SLOCUM,
W. C. TABER.